C. T. MASON.
ELECTRIC BATTERY HOLDER.
APPLICATION FILED MAR. 12, 1909.
952,268.
Patented Mar. 15, 1910.
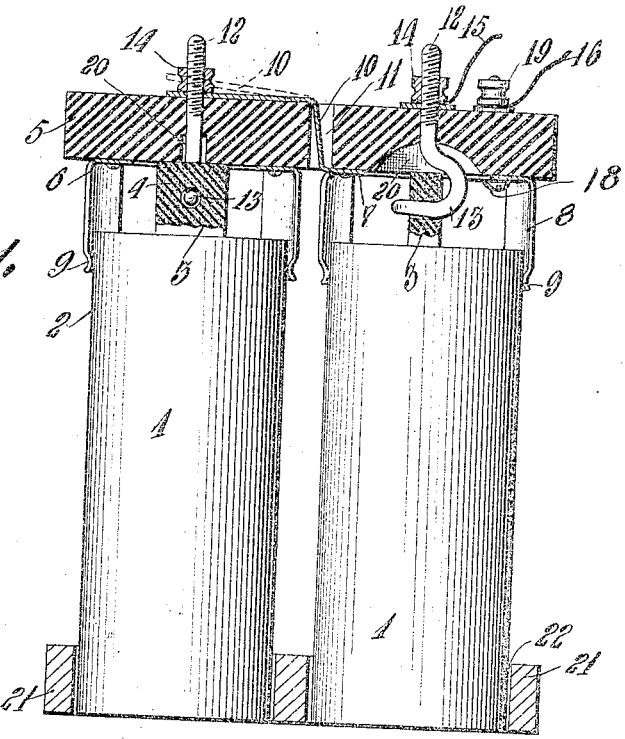
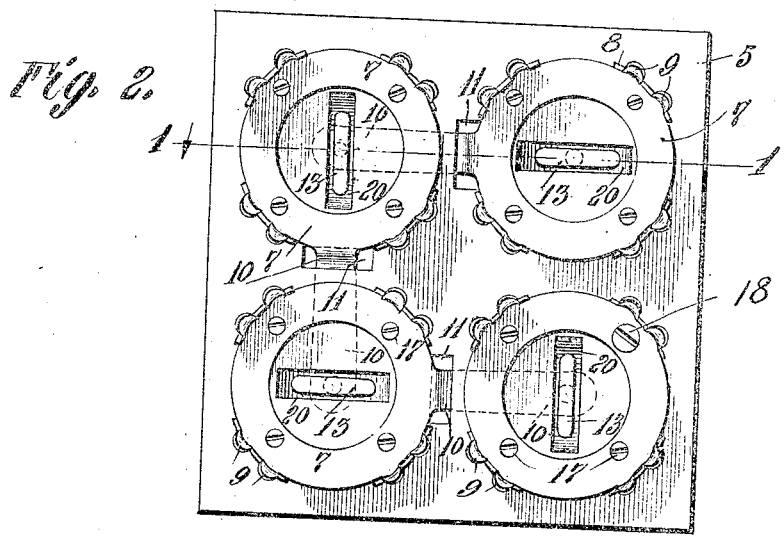
Witnesses
Morris Lessin
E. M. Ricketts
Inventor
Carl T. Mason
By Watson E. Coleman
Attorney

UNITED STATES PATENT OFFICE.

CARL T. MASON, OF SUMTER, SOUTH CAROLINA.

ELECTRIC-BATTERY HOLDER.

952,268.  Specification of Letters Patent.  Patented Mar. 15, 1910.

Application filed March 12, 1909. Serial No. 482,977.

*To all whom it may concern:*

Be it known that I, CARL T. MASON, a citizen of the United States, residing at Sumter, in the county of Sumter and State of South Carolina, have invented certain new and useful Improvements in Electric-Battery Holders, of which the following is a specification, reference being had to the accompanying drawings This invention relates to improvements in electric battery holders of that class in which the desired electrical connections between the cells are automatically effected by the placing and securing of the cells in the holder.

The object of the invention is to improve and simplify the construction of devices of this character and provide improved means for fastening the battery cells to the insulating head.

With the above and other objects in view the invention consists in the novel construction, combination and arrangement of parts hereinafter fully described and claimed and illustrated in the accompanying drawings, in which—

Figure 1 is a vertical section through my improved battery holder, the plane of the section being indicated by the line 1—1 in Fig. 2, and Fig. 2 is a plan view of the lower face of the insulating head.

My improved battery holder is especially adapted for use in connection with cells 1 having an exterior electrode 2 preferably forming the container for an electrolyte and an interior electrode 3. The exterior containing electrode 2 is made from zinc or other suitable metal while the inner electrode 3 is preferably in the form of a stick of carbon and is centrally arranged, its upper end projecting above the top of the cell to provide an attaching lug which has a transverse aperture or opening 4.

The improved holder comprises an insulating head 5 of any suitable size and shape according to the number and arrangement of the cells composing the battery. Said insulating head or plate 5 is disposed over the tops of the cells 1 and has secured to its under side a plurality of connectors 6 one of the latter being provided for each of the cells. Each of said connectors consists of an annular conducting plate 7 from the periphery of which depend resilient fingers 8 arranged to form a socket for the reception of the upper portion of one of the cells 1. Said cell engaging fingers 8 have their lower ends curved transversely and longitudinally to provide sharp edges 9 which will grip the metal electrode 2 and secure an effective contact with the same. The connectors 6 are also provided with conducting tongues 10 which project radially from the annular plates or rings 7 and which are bent upwardly so as to project through vertical openings 11 formed in the head 5. The projecting portions of the tongues 10, which latter are resilient, extend from the slots 11 to the contact terminal 12 of the next adjacent cell in the series. The terminals 12 are in the form of bolts which extend vertically through the insulating head 5 and which have their lower ends formed with hook-shaped heads 13 to enter the openings 4 in the electrodes 3 of the cells 1.

The screw-threaded upper ends of the bolts or hooks 12 extend through openings in the resilient conducting tongues 10 and have applied to them thumb nuts 14 which not only clamp the tongues 10 down upon the top of the head 5 and secure an effective electrical connection between said tongues and terminal bolts but also draw the bolts upwardly so that their hook-shaped lower ends 13 will press the tops of the carbon electrodes 3 against the bottom face of the head 5 and thereby effectively retain the cells 1 within the sockets formed by the fingers 8. Owing to this arrangement of the connectors 6 with their tongues 10 and the terminal bolts or hooks 12, it will be seen upon reference to Fig. 2, that the cells will be connected in series, the zinc electrode of each cell being electrically connected to the carbon electrode of the next adjacent one of the series; and that one of the electrical conductors 15 of the circuit may be connected to any one of the bolts 12 while the other conductor 16 may be connected to one of the connectors 6. As illustrated said connectors are secured to the insulating head 5 by screws 17 and one of the screws 18 of the connector at one end of the series upon the head 5 is made larger than the others so as to extend through the top of the head 5 and provide a binding post 19 to which the conductor 16 is connected while the other conductor 15 is connected to the bolt or terminal 12 of the carbon electrode of the cell at the other end of the series. For the purpose of preventing the bolts 12 from rotating when the cells are being applied to or removed from the holder and also while the nuts 14 are being secured down upon said bolts, the hook-shaped heads 13 project into the kerfs or cavities 20 cut into the bottom face of the head 5 as clearly shown in Figs. 1 and 2 of the drawing. Owing to the resiliency of the tongues 10, it will be seen that even though the nuts 14 work loose on the bolts 12, said tongues will follow the nuts and maintain effective contact with the bolts 12 as will be understood upon reference to the dotted lines in Fig. 1.

For the purpose of effectively maintaining the cells 1 of the battery in spaced relation within the box or other casing in which the battery is carried, I may place in the bottom of such box or casing a board or plate 21 containing a plurality of sockets or openings 22 for the reception of the lower ends of the cells as clearly shown in Fig. 1.

Having thus described the invention, what is claimed, is:

1. An electric battery holder comprising an insulating head formed with vertical openings, a plurality of connectors secured to the under side of said head having means to contact with the exterior electrodes of the cells, conducting tongues projecting from said connectors and upwardly through the openings in said head and terminals extending through the head and having their lower ends engaged with interior electrodes of the cells and their upper ends engaged with said tongues.

2. An electric battery holder comprising an insulating head formed with vertical openings, connectors secured to the under side of said head and forming sockets for the cells and contact terminals to engage the exterior electrodes of the cells, conducting tongues extending from said connectors and through the openings in the head, inner contact terminals extending through and vertically movable in the head, means at the lower ends of said inner contact terminals to engage the interior electrodes of the cells and retain the latter in their sockets and means arranged upon the upper ends of said inner contact terminals for actuating them upwardly and retaining the conducting tongues in electrical contact therewith.

3. The combination with cells having exterior electrodes and interior electrodes the latter having projecting apertured ends, of a battery holder having an insulating head formed with vertical openings, a plurality of connectors secured to the under side of said head and forming sockets to receive the cells and outer contact terminals to engage the exterior electrodes of the cells, conducting tongues extending from said connectors and through the openings in said head, bolts arranged for vertical sliding movement in said head and having hook-shaped lower ends to enter the openings in the projecting upper ends of the interior electrodes of the cells, said conducting tongues having their ends apertured to receive the projecting upper ends of the bolts, and nuts arranged upon the threaded upper ends of said bolts for the purpose specified.

In testimony whereof I hereunto affix my signature in the presence of two witnesses.

CARL T. MASON.

Witnesses:
E. M. HALL,
ERNEST RHAME.